United States Patent [19]
Ando et al.

[11] Patent Number: 6,023,305
[45] Date of Patent: Feb. 8, 2000

[54] PRIMARY COLOR VIDEO SIGNAL OUTPUT CIRCUIT

[75] Inventors: Hiroshi Ando, Ibaraki; Nobuo Taketani, Kawanishi; Tsuneo Matsukura, Settsu; Hiroyasu Shimaoka, Takatsuki; Hitoshi Adachi, Ibaraki; Yoichi Kanegami, Takatsuki; Hiroki Kinugawa, Kusatsu, all of Japan

[73] Assignee: Matsushita Electric Industrial Co., Ltd., Osaka, Japan

[21] Appl. No.: 08/872,300

[22] Filed: Jun. 10, 1997

[30] Foreign Application Priority Data

Jun. 10, 1996 [JP] Japan .................................. 8-146967

[51] Int. Cl.⁷ .............................. H04N 5/52; H04N 5/16
[52] U.S. Cl. .......................... 348/679; 348/690; 348/692
[58] Field of Search ..................... 348/678, 679, 348/690, 691, 692; H04N 5/18, 5/52, 5/16

[56] References Cited

U.S. PATENT DOCUMENTS 4,680,624  7/1987  Murakami .

FOREIGN PATENT DOCUMENTS

| 55-46688 | 4/1980 | Japan . |
|---|---|---|
| 61242185 | 10/1986 | Japan . |
| 6268370 | 3/1987 | Japan . |
| 63100876 | 5/1988 | Japan . |
| 2206282 | 8/1990 | Japan . |
| 4369176 | 12/1992 | Japan . |
| H7-230332 | 8/1995 | Japan . |
| H8-36435 | 2/1996 | Japan . |

*Primary Examiner*—Sherrie Hsia
*Attorney, Agent, or Firm*—Ratner & Prestia

[57] ABSTRACT

A primary color video output circuit for limiting an input video signal. The circuit includes a clipping circuit, a reference voltage generating circuit and an amplifier. The clipping circuit limits the level of the input video signal based on a reference voltage generated by the reference voltage generating circuit. The amplifier is then used to amplify the clipped video signal.

10 Claims, 11 Drawing Sheets

PRIMARY COLOR VIDEO SIGNAL OUTPUT CIRCUIT

FIELD OF THE INVENTION

The present invention relates to a primary color video signal output circuit used in television receivers or other video display devices.

BACKGROUND OF THE INVENTION

Television and monitor displays may be subject to high luminance signals. As a result, when there is higher saturation of color, higher luminance, or larger amplitude in a video signal than desired, the linearity of reproduction of color signals may be sacrificed. This leads to an undesirable color saturation (color distortion) on the display screen. To solve this problem, a primary color video signal output circuit is disclosed, for example, in Japanese Laid-open Patent No. 55-46688.

FIG. 10 is a block diagram showing a portion of one channel of a conventional video signal output circuit composed of plural primary color signal output circuits.

In FIG. 10, a primary color video signal 101 is applied to a clip circuit composed of a Zener diode 103. An inverting amplifier composed of a power supply unit 104, a resistance 105, a transistor 106, and a resistance 107, through a circuit 102 aligns the black level of each primary color video signal for the display element (not shown), and adjusts white balance of the signal at specified brightness (hereinafter called cutoff/drive adjusting circuit).

The clip circuit is for clipping the signal at a specific constant level, before inputting the signal into the inverting amplifier, so as to not spoil the linearity of the output signal, by not excessively driving the inverting amplifier. Excessive driving of a succeeding video signal processing circuit and a succeeding display element are also prevented.

The operation of the video signal output circuit is described below.

FIG. 11A, FIG. 11B, and FIG. 11C show a conceptual diagram of an input signal and an output signal of the video signal output circuit. More specifically, FIG. 11A shows a signal waveform diagram when the clip circuit is not used, and FIG. 11B shows an expected signal waveform diagram when the clip circuit is used.

The clip circuit clips the video signal so that the succeeding video signal processing circuit and display element may not be driven excessively.

The saturation level LS shown in FIG. 11A and FIG. 11B refers to the peak value of maximum signal voltage that can be processed by the inverting amplifying circuit, succeeding video signal processing circuit, and display element. Clipping is done at a level within this saturation level LS.

The cutoff level LC refers to the black level of display element.

Initially, the Zener diode was used in the clip circuit for the purpose of utilizing the feature produced by the Zener characteristic, that is, when exceeding the Zener voltage, the Zener current is raised very violently, so that a constant voltage is obtained.

In this circuit, however, depending on the characteristic of the Zener diode, the picture is blunted near the clip level.

Individual Zener diodes are not always identical in characteristics. Therefore, clipping may differ depending on the individual difference of characteristics of Zener diodes.

In commercial Zener diodes, the inverse bias voltage, when passing a specified current to the diode, is controlled very well. A specified narrow width of a voltage is shown. However, in the region of current smaller than the specified current, the diode inverse bias voltage is not controlled, and the fluctuation width of the voltage is wide. Although the leak current of the Zener diode is a lower value than the specified current, some current is flowing and is not controlled. This is because the leak current of the Zener diode may not be an important control item in manufacture as long as this value is below the specified value.

When a Zener diode is used in a clip circuit, the leak current increases before the Zener potential of the Zener diode is reached. The waveform of the primary color video signal 101 begins to be blunted at a lower voltage than actually clipped. Thus, linearity of the signal is broken. FIG. 11C shows a blunt profile of a wave form when clipped by the Zener diode. Ideally, the primary color video signal 101 is clipped in the portion higher than the Zener voltage.

Depending on the variations of characteristics of the Zener diodes being used, however, the manner of collapse of linearity of the video signal differs in each channel, which may possibly lead to collapse of linearity of the white balance signal in the high luminance region.

SUMMARY OF THE INVENTION

A primary color video signal output circuit in accordance with an exemplary embodiment of the invention comprises, in order to limit the excessive input of video signal, a clip circuit for clipping the signal by a transistor, a reference voltage generating circuit for defining the clip voltage, and an amplifying circuit for driving the display elements. Thus, the primary color video output circuit solves the problem of collapse of the white balance signal at high luminance experienced in the conventional circuit.

That is, the clip circuit in accordance with the present invention severely limits the flow of leak current in a low voltage region below the clip voltage, and passes the current steeply when the video signal is at a voltage above the clip voltage, thereby clipping securely.

As a result, the peak value of video signal can be cut sharply. Thus, the primary video output circuit prevents deviation of white balance and color saturation (color distortion) signals in the high luminance region.

DESCRIPTION OF THE PREFERRED EMBODIMENTS

First Exemplary Embodiment

A first exemplary embodiment of primary color video signal output circuit in accordance with the present invention is described while referring to FIGS. 1, 2A, 2B, and 2C.

Figure 1:
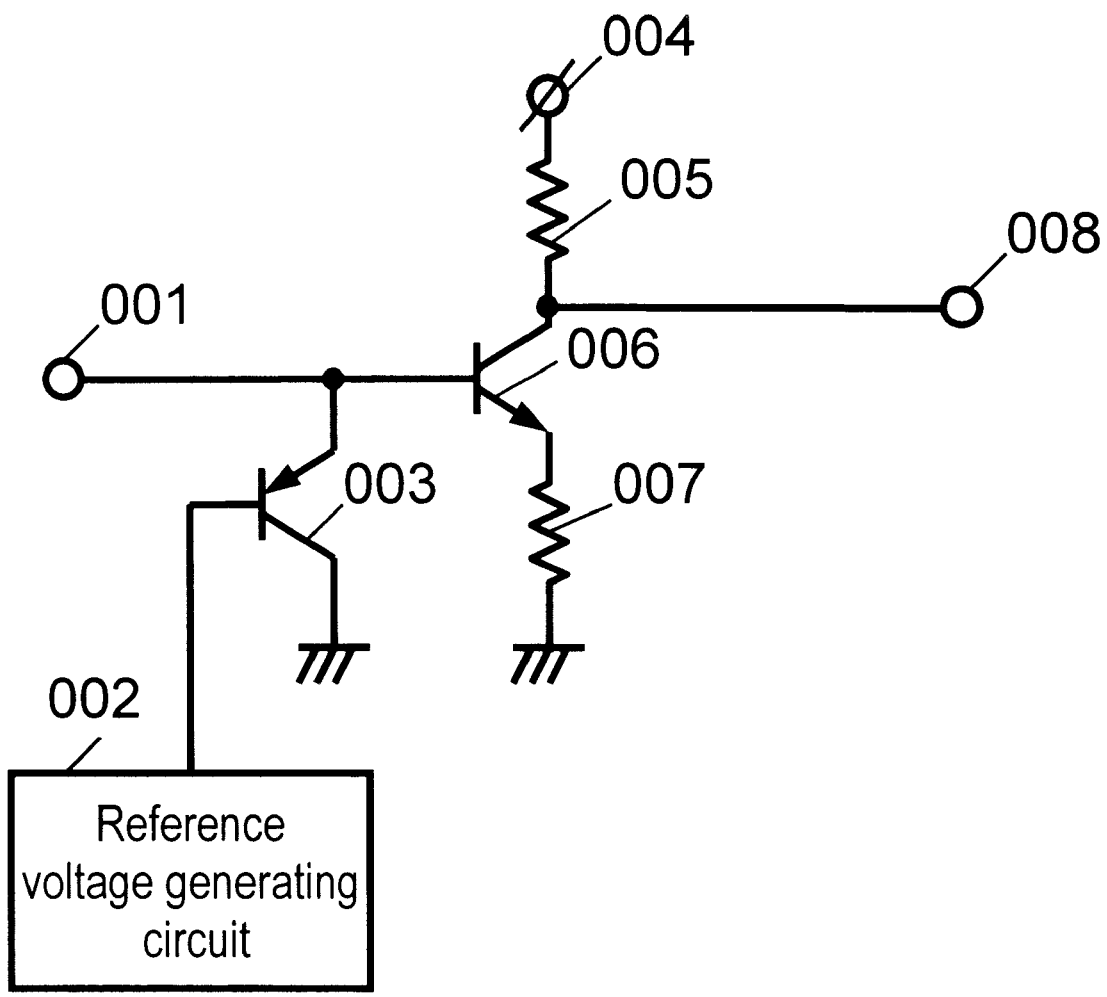
FIG. 1 is a block diagram of a primary color video signal output circuit according to a first exemplary embodiment of the invention.

In FIG. 1, a primary color video input signal 001 enters the base electrode of an inverting amplifying transistor 006 composing an inverting amplifier together with a power supply unit 004, a collector load resistance 005, and an emitter resistance 007.

The inverting amplifier inverts and amplifies the primary color video input signal 001, and delivers a primary color output video signal 008 for driving a display element (not shown).

The emitter electrode of a clip transistor 003 working as a clip circuit is connected to the base circuit of the inverting amplifier, and the collector electrode is grounded. That is, the clip circuit composed of the clip transistor 003 and a reference voltage generating circuit 002 is inserted so as to shunt the base circuit of the inverting amplifying transistor 006 for composing the inverting amplifying circuit.

A reference voltage is supplied to the base electrode of the clip transistor 003 from the reference voltage generating circuit 002.

If the amplitude of the primary color video input signal 001 exceeds the voltage defined by the reference voltage generating circuit 002, the clip transistor 003 conducts, and the primary color video input signal 001 is clipped.

Figure 2A:
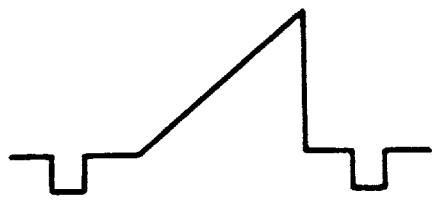
FIG. 2A is a primary color video signal waveform diagram before clipping in the first exemplary embodiment of the invention.
Figure 2B:
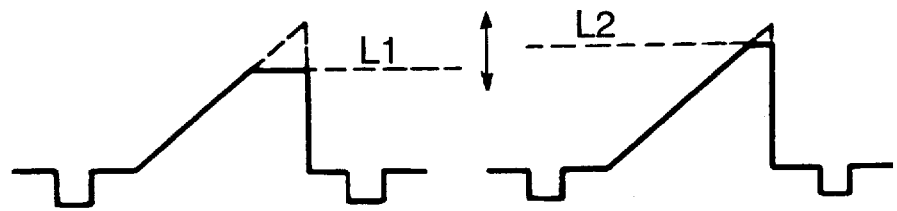
FIG. 2B is a clipped primary color video signal waveform diagram in the first exemplary embodiment of the invention.
Figure 2C:
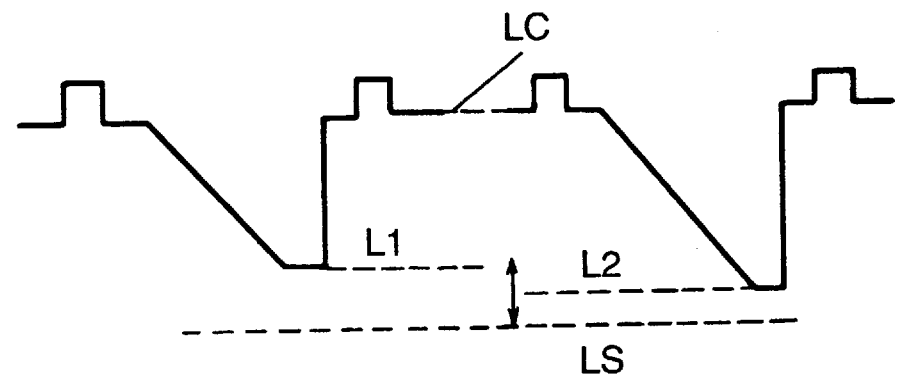
FIG. 2C is a primary color video signal waveform diagram preceding the display element in the first exemplary embodiment of the invention.

FIG. 2A shows a primary color video signal waveform applied to the inverting amplifying transistor 006 when clip circuit is not provided. FIG. 2B shows a primary color video signal waveform applied to the inverting amplifying transistor 006 when the clip transistor 003 of the clip circuit is used. FIG. 2C shows a display element driving primary color video signal waveform delivered from the inverting amplifying circuit.

In FIGS. 2B and 2C, L1 and L2 represent variable clip levels, showing that the variable range of the reference voltage supplied from the reference voltage generating circuit 002 in FIG. 1 can be changed from L1 to L2. Also in FIG. 2C, LS represents the saturation level, which is the peak value of the maximum signal voltage delivered when the display element begins to show distortion. LC indicates the cutoff level, showing the black level of the display element.

In such constitution, when the voltage of the primary color video signal is below the reference voltage, the clip circuit does not operate at all, and the primary color video signal output circuit is in a state which is the same as when the clip circuit is not provided.

The clip circuit begins to operate only when the voltage of the primary color video signal exceeds the reference voltage.

When the voltage of the primary color video signal exceeds the reference voltage, the exceeded voltage is divided between the source output resistance of the signal entering the inverting amplifying transistor 006 and the resistance indicated by the clip transistor 003.

Of course, as compared with the former, the latter shows an extremely low value, and hence the primary color video signal is clipped at this level.

In the case of a transistor, the reverse current is extremely low as compared with the forward current, and while the voltage is applied in the reverse direction, the current flowing in the reverse direction can be completely ignored. Therefore, by making use of the forward characteristic of a transistor in a clip circuit, the clip circuit can clip the signal sharply.

Moreover, by varying the reference voltage supplied from the reference voltage generating circuit, an arbitrary clip level can be adjusted.

Second Exemplary Embodiment

Figure 3:
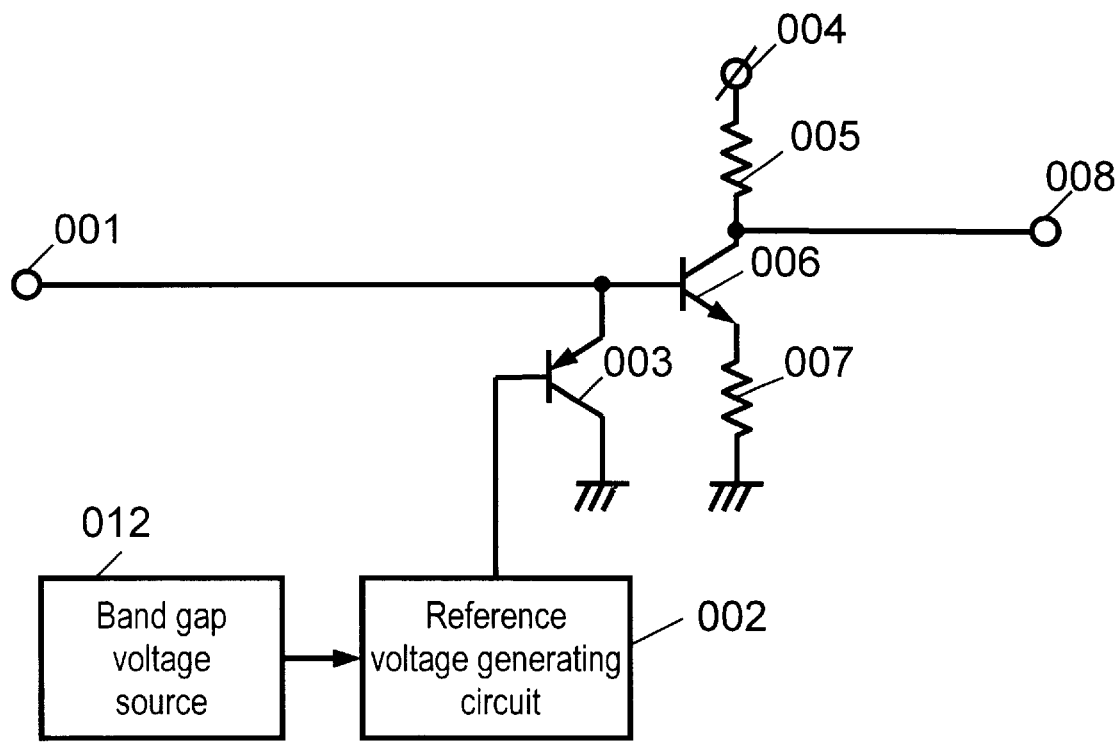
FIG. 3 is a block diagram of a primary color video signal output circuit according to a second exemplary embodiment of the invention.

A second exemplary embodiment of a primary color video signal output circuit in accordance with the present invention is described while referring to FIG. 3.

In FIG. 3, except for a band gap voltage source 012, the same circuit elements as in FIG. 1 operate similarly, and duplicated explanations are omitted.

The band gap voltage source 012 generates a constant voltage, not depending so much on the supply voltage or temperature fluctuations as disclosed in Japanese Laid-open Patent H7-230332 or Japanese Laid-open Patent H8-36435, so that the signal can be clipped at a higher precision.

The embodiment presents a primary color video signal output circuit which supplies a voltage from the band gap voltage source 012 into the reference voltage generating circuit 002, and therefore a clip voltage of high precision can be obtained.

In this constitution, if the supply voltage or temperature fluctuates due to variations of peripheral elements in mass production, the once set clip level is hardly changed, and it is effective to avoid color saturation (color distortion) and white balance signal deviation due to fluctuations of clip level caused by time-course changes or condition changes.

Third Exemplary Embodiment

Figure 4:
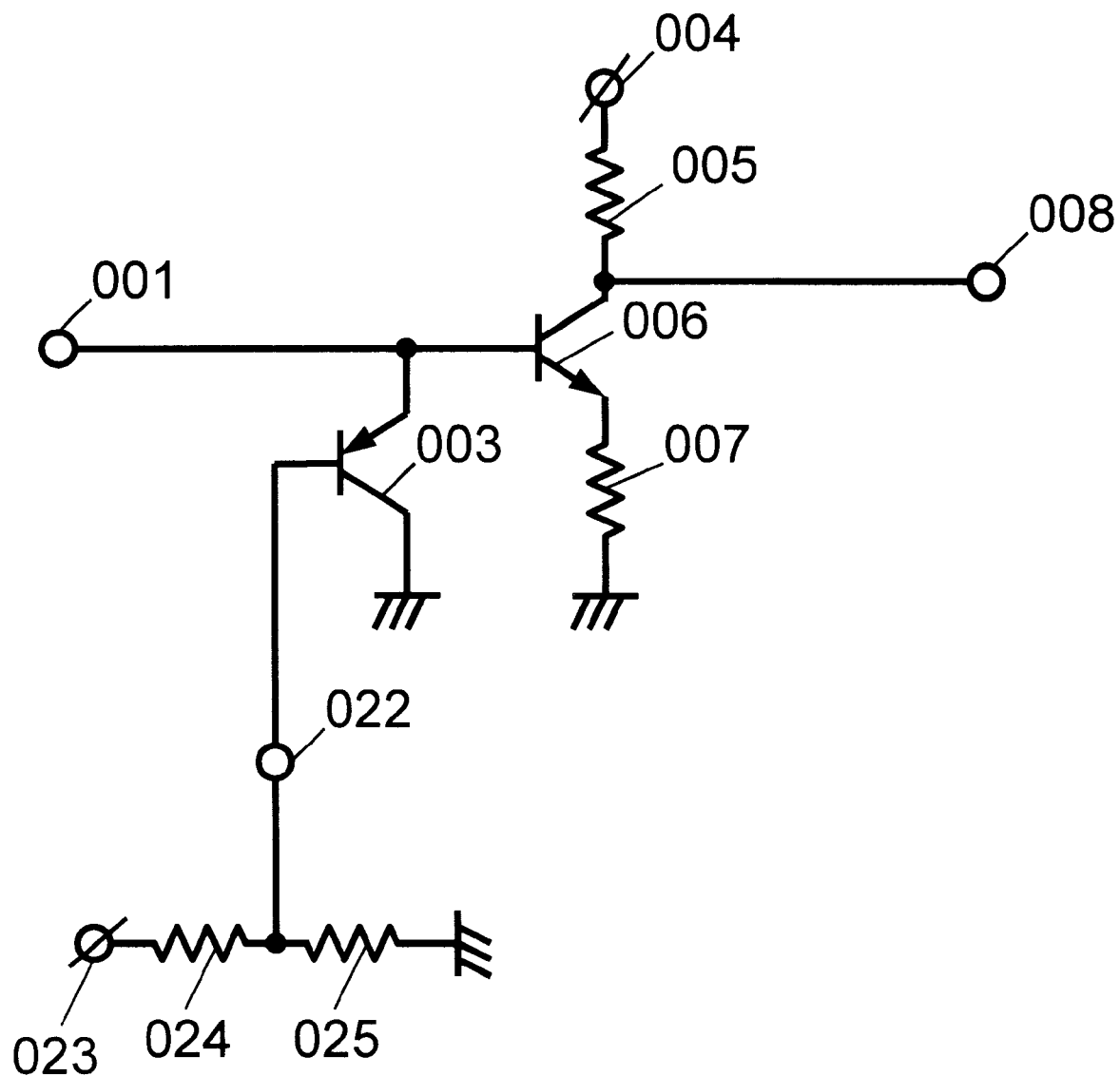
FIG. 4 is a block diagram of a primary color video signal output circuit according to a third exemplary embodiment of the invention.

A third exemplary embodiment of a primary color video signal output circuit in accordance with the present invention is described while referring to FIG. 4.

In FIG. 4, except for a power source 023 for supplying a reference voltage which is divided between resistance 024 and resistance 025 and which is applied to the base terminal of a clip transistor 026, the same circuit elements as in FIG. 1 operate similarly, and duplicated explanations are omitted.

As mentioned also in the first embodiment, FIG. 4 shows an example of setting the reference voltage at a desired value, not limited by the power source voltage applied to the reference voltage generating circuit.

The power source 023 may be a band gap voltage source shown in FIG. 3, or other power source as far as it is stable. The voltage of the power source is divided by the resistance 024 and the resistance 025 into an optimum value for setting the clip level. The divided voltage is supplied into the base electrode of the clip transistor 003.

Figure 4A:
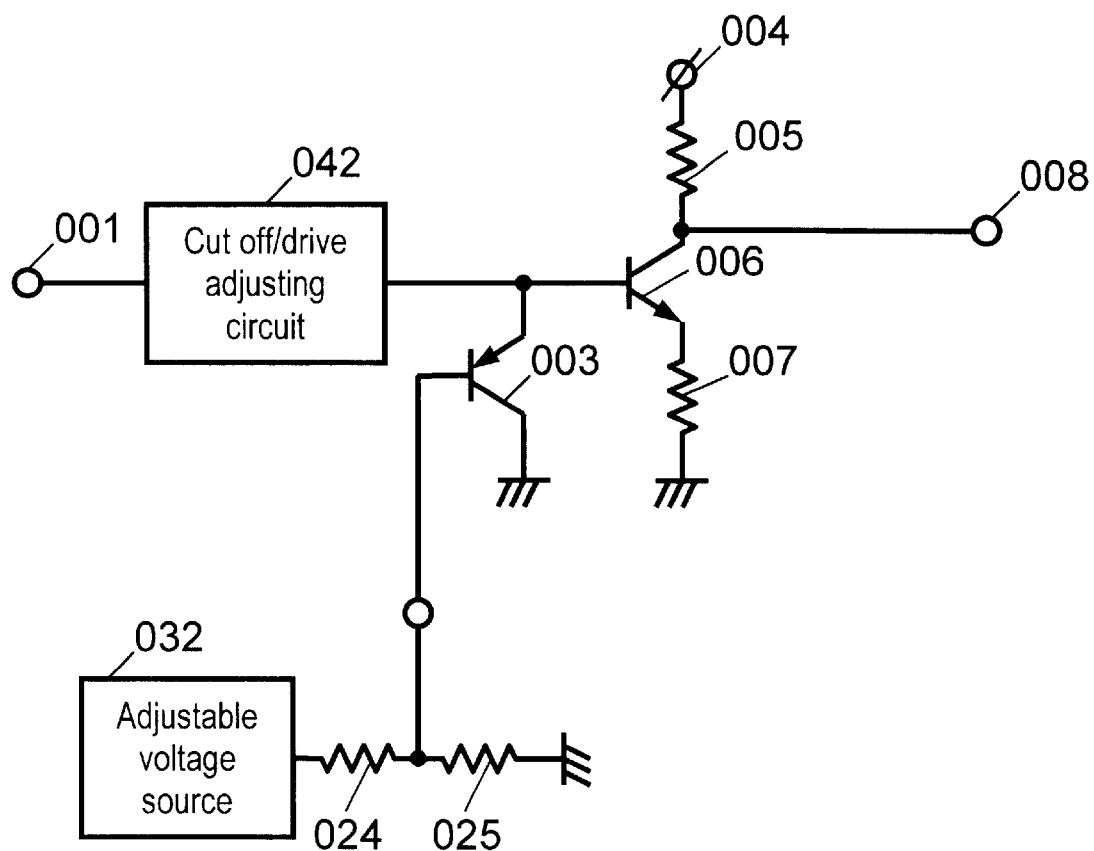
FIG. 4A is a block diagram of a primary color video signal output circuit according to a further exemplary embodiment of the invention.

In FIG. 4A, a cutoff/drive adjusting circuit 042 is a circuit for adjusting the cutoff voltage of the display element and aligning the black levels of primary color driving signals, and for adjusting the voltage of each primary color driving signal so that the primary color driving signal is balanced in white at an arbitrary voltage. In addition, a variable voltage source 032 replaces the power source 023. In all other respects the same circuit elements as in FIG. 4 operate similarly, and duplicated explanations are omitted.

In this constitution, the reference voltage can be selected arbitrarily, that is the reference voltage may be adjustable. Thus, the precision of the reference voltage can be enhanced and fluctuations of the reference voltage can be kept to a minimum limit.

Fourth Exemplary Embodiment

Figure 5:
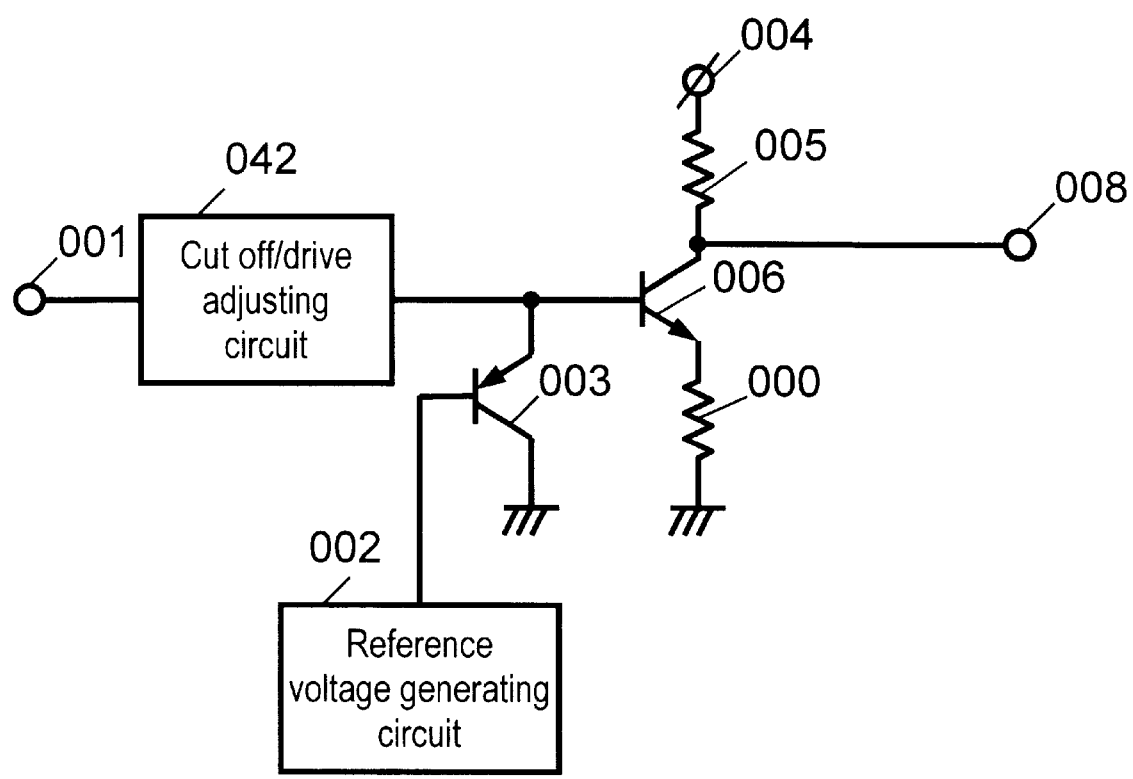
FIG. 5 is a block diagram of a primary color video signal output circuit according to a fourth exemplary embodiment of the invention.

A fourth exemplary embodiment of a primary color video signal output circuit in accordance with the present invention is described while referring to FIG. 5.

In FIG. 5, except for a cutoff/drive adjusting circuit 042, the same circuit elements as in FIG. 1 operate similarly, and duplicated explanations are omitted.

The cutoff/drive adjusting circuit 042 is a circuit for adjusting the cutoff voltage of the display element and aligning the black levels of primary color driving signals, and for adjusting the voltage of each primary color driving signal so that the primary color driving signal is balanced in white at an arbitrary voltage.

Figure 5A:
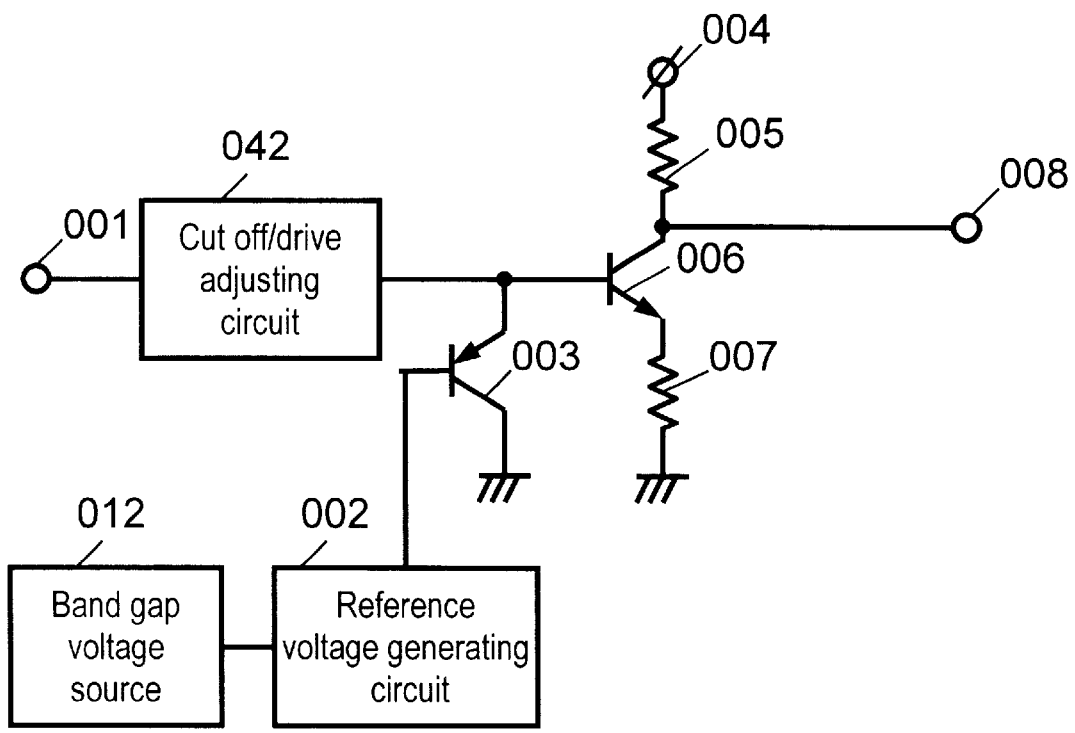
FIG. 5A is a block diagram of a primary color video signal output circuit according to another exemplary embodiment of the invention.

In FIG. 5A, except for a band gap voltage source 012 described in the second exemplary embodiment, the same circuit elements as in FIG. 5 operate similarly, and duplicated explanations are omitted.

In such constitution, after the cutoff/drive adjustment, the video signal is clipped, and hence the precision of clip operation is high, and the clip level is not changed if the adjustment of cutoff/drive is changed.

Fifth Exemplary Embodiment

Figure 6:
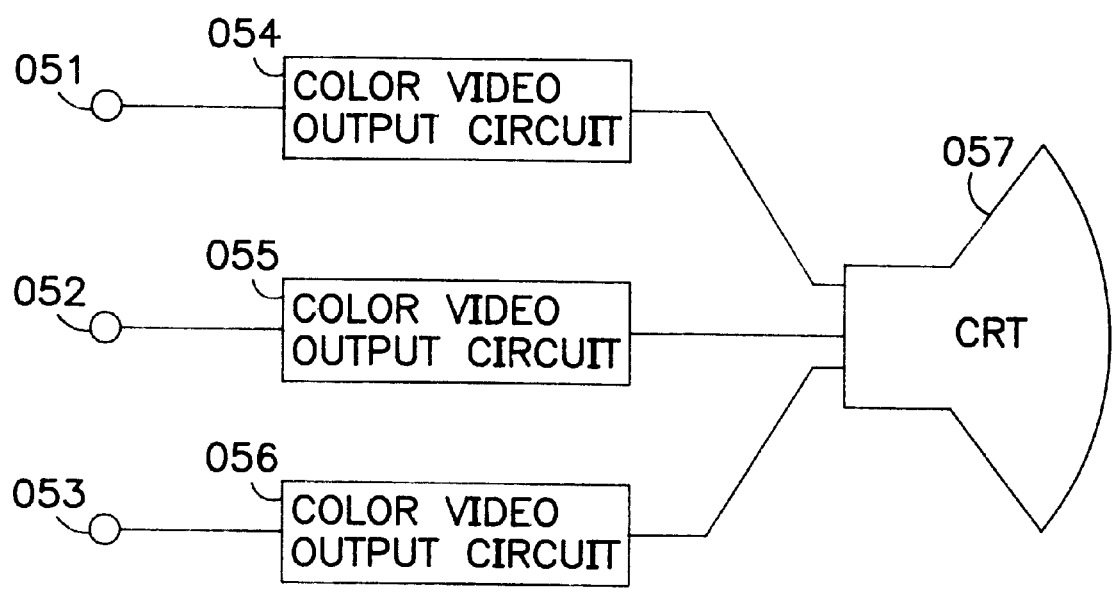
FIG. 6 is a block diagram of a CRT display using a primary color video signal output circuit according to a fifth exemplary embodiment of the invention.

A display device using a CRT, comprising the primary color video signal output circuit according to an exemplary embodiment of the invention, is described while referring to FIG. 6.

FIG. 6 shows R, G and B primary color video signal output circuits 054, 055, and 056 for receiving R, G, and B primary color video input signals 051, 052, and 053, and delivering primary color video signals for driving a CRT 057.

Each primary color video signal output circuit is the primary color video signal output circuit including the clip circuit as described in the first, second, third or fourth embodiments.

Thus, the primary color video signal output circuit of the invention can be used in the CRT display, and the effects mentioned in the first, second, third or fourth embodiments can be obtained.

Sixth Exemplary Embodiment

Figure 8:
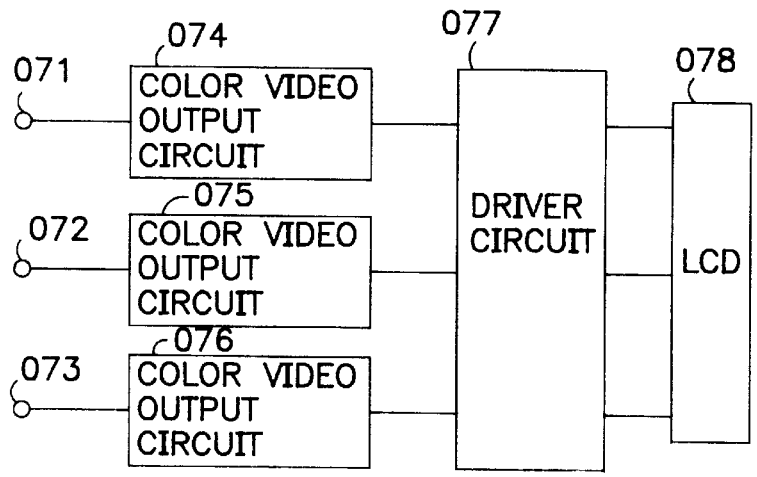
FIG. 8 is a block diagram of a liquid crystal display using a primary color video signal output circuit according to a seventh exemplary embodiment of the invention.

A display device using a liquid crystal display element, comprising the primary color video signal output circuit according to an exemplary embodiment of the present invention, is described while referring to FIG. 8.

In FIG. 8, R, G and B primary color video input signals 071, 072, and 073 are fed into primary color video signal output circuits 074, 075, and 076, and delivered to a succeeding driving circuit 077.

The driving circuit 077 processes the video signal so as to drive a liquid crystal display element 078, and delivers to the liquid crystal display element 078.

The primary color video signal output circuits 074, 075, and 076 are the primary color video signal output circuits of the invention including the clip circuits as described in the first, second, third and fourth embodiments.

Thus, the primary color video signal output circuit of the invention can be used in the liquid crystal display, and the effects mentioned in the first, second, third or fourth embodiments can be obtained.

Seventh Exemplary Embodiment

Figure 9:
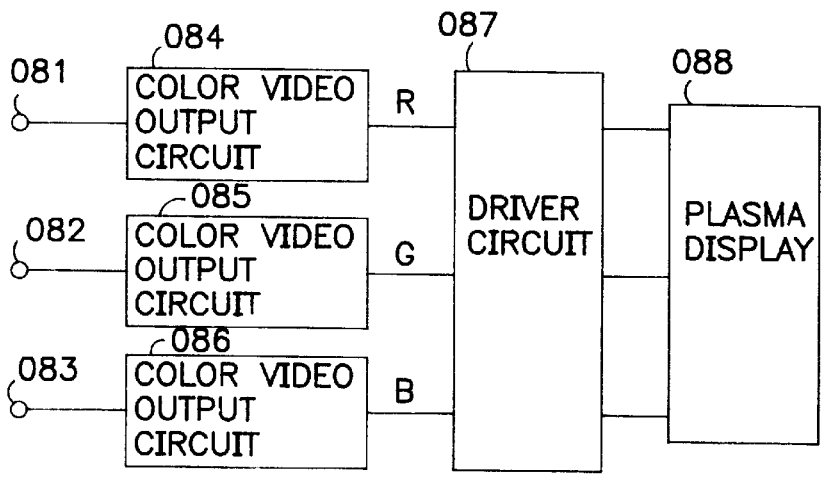
FIG. 9 is a block diagram of a plasma display using a primary color video signal output circuit according to an eighth exemplary embodiment of the invention.
Figure 10:
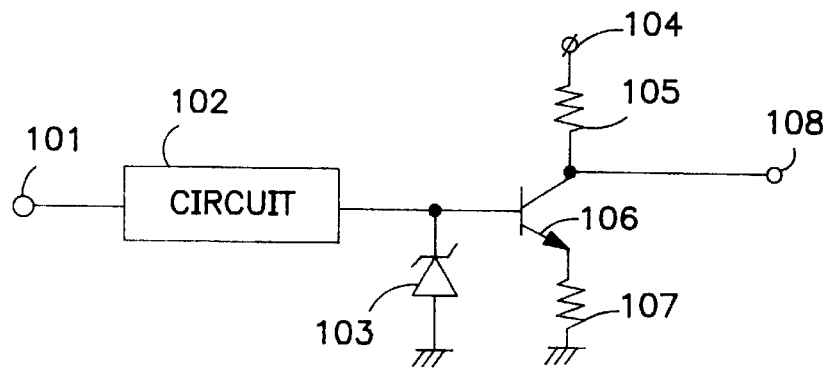
FIG. 10 is a block diagram of a primary color video signal output circuit in accordance with the prior art device.
Figure 11A:
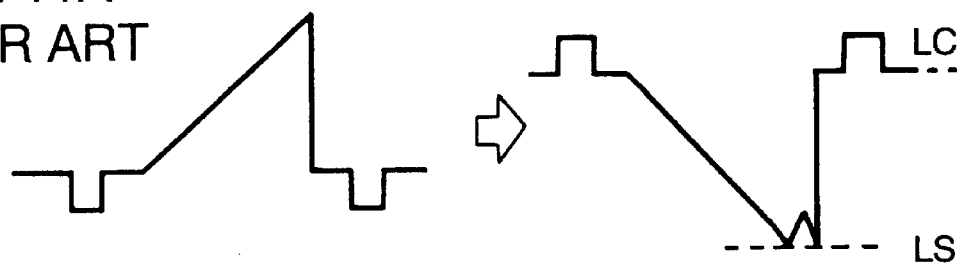
FIG. 11A is a conventional signal waveform diagram without a clip circuit.
Figure 11B:
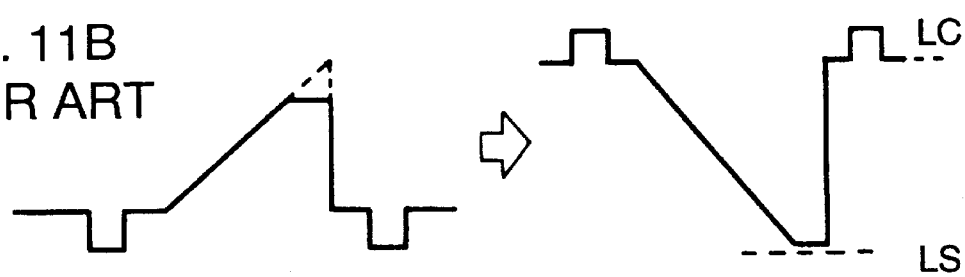
FIG. 11B is a conventional signal waveform diagram including a clip circuit.
Figure 11C:
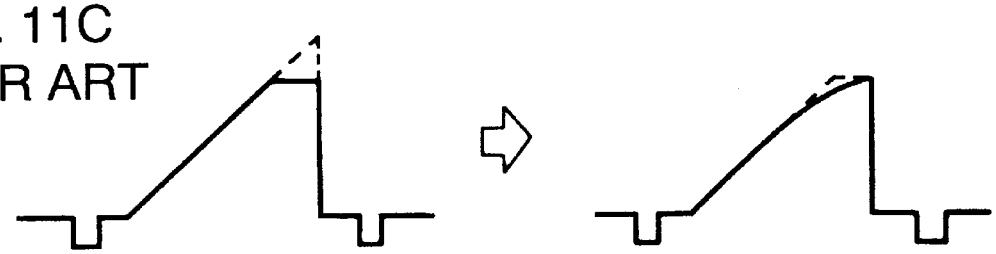
FIG. 11C is a conventional conceptual diagram of blunting a waveform when clipped by a Zener diode.

A display device using a plasma display element, comprising the primary color video signal output circuit according to an exemplary embodiment of the present invention, is described while referring to FIG. 9.

In FIG. 9, R, G and B primary color video input signals 081, 082, and 083 are fed into primary color video signal output circuits 084, 085, and 086, and delivered to a succeeding driving circuit 087.

The driving circuit 087 processes the video signal so as to drive a plasma display element 088.

The primary color video signal output circuits are the primary color video signal output circuits of the invention including the clip circuits as described in the first, second, third and fourth embodiments.

Thus, the primary color video signal output circuit of the invention can be used in a plasma display, and the effects mentioned in the first, second, third or fourth embodiments can be obtained.

Eighth Exemplary Embodiment

A television receiver using the primary color video signal output circuit according to an exemplary embodiment of the invention is described below while referring to FIG. 7.

Figure 7:
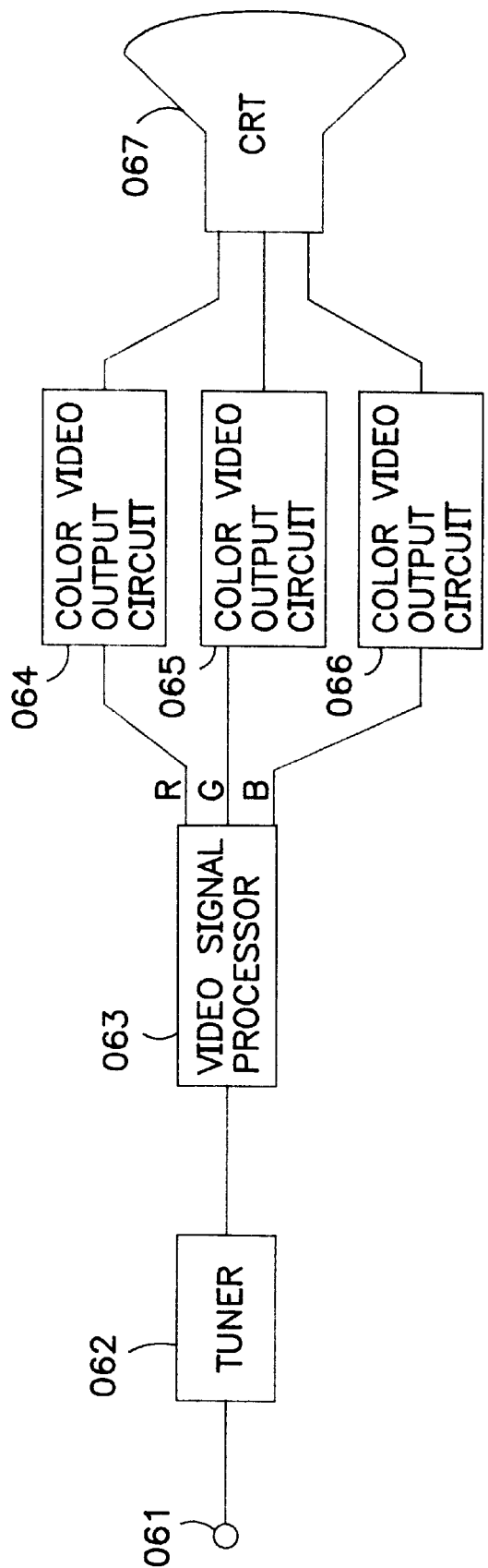
FIG. 7 is a block diagram of a television receiver using a primary color video signal output circuit according to a sixth exemplary embodiment of the invention.

In FIG. 7, a television carrier signal 061 entered from an antenna is selected and detected in a tuner 062, and the detected video signal is fed into a video signal processing circuit 063.

The video signal processing circuit 063 demodulates the video signal and delivers R, G and B primary color video signals. Succeeding primary color video signal output circuits 064, 065, and 066 to which the R, G and B primary color video signals are fed, and a CRT 067 are same as shown in FIG. 6.

The succeeding primary color video signal output circuits, and the display are same as in the first, second, third, and fourth embodiments.

In FIG. 7, the CRT is used as the display element, but it is applicable to other display elements, such as liquid crystal display elements and plasma display elements.

Thus, the primary color video signal output circuit according to an exemplary embodiment of the invention can be used in the television receiver.

What is claimed is:

1. A primary color video signal output circuit for limiting input of a video signal comprising:

a reference voltage generating circuit for outputting a reference voltage, a clip circuit for receiving said reference voltage for clipping said video signal based on said reference voltage, a band gap voltage source wherein said reference voltage generating circuit is coupled to the band gap voltage source, and an amplifying circuit for amplifying the video signal.

2. A primary color video signal output circuit for limiting input of a video signal comprising:

a reference voltage generating circuit for outputting a reference voltage, a clip circuit for receiving said reference voltage for clipping said video signal based on said reference voltage, cutoff/drive adjusting circuit coupled to the clip circuit for cutoff/drive adjustment of the video signal, and an amplifying circuit for amplifying the video signal.

3. A primary color video signal output circuit according to claim 1, further comprising a cutoff/drive adjusting circuit coupled to the clip circuit for cutoff/drive adjustment of the video signal.

4. A primary color video signal output circuit for limiting input of a video signal comprising:

an adjustable reference voltage generating circuit for outputting a reference voltage, a clip circuit for receiving said reference voltage for clipping said video signal based on said reference voltage, a cutoff/drive adjusting circuit coupled to the clip circuit for cutoff/drive adjustment of the video signal, and an amplifying circuit for amplifying the video signal.

5. A display device for use with a display element, comprising:

a primary color video signal output circuit which includes a reference voltage generating circuit for outputting a reference voltage, and a clip circuit for receiving said reference voltage and for clipping said video signal to limit input of said video signal, and an amplifying circuit for driving said display element.

6. A television receiver comprising:

a display element, a primary color video signal output circuit which includes a reference voltage generating circuit for outputting a reference voltage, and a clip circuit for receiving said reference voltage and for clipping a video signal to limit input of said video signal, and an amplifying circuit for driving said display element.

7. A primary color video signal output circuit according to claim 1, wherein the clip circuit comprises a transistor having a base terminal which is connected to the reference voltage generating circuit, an emitter terminal which is connected to an input terminal of the amplifying circuit, and a collector terminal which is grounded.

8. A primary color video signal output circuit according to claim 7, further comprising a band gap voltage source wherein the reference voltage generating circuit is coupled to the band gap voltage source.

9. A primary color video signal output circuit according to claim 7, wherein the reference voltage is divided by a resistance coupled to the base terminal of the transistor.

10. A primary color video signal output circuit according to claim 7, further comprising a cutoff/drive adjusting circuit coupled to the clip circuit for cutoff/drive adjustment of the video signal.

* * * * *